(12) United States Patent
Kane

(10) Patent No.: US 7,778,865 B1
(45) Date of Patent: Aug. 17, 2010

(54) DISTRIBUTIONAL ASSESSMENT SYSTEM

(76) Inventor: Jeffrey S. Kane, 3374 Trevan Rd., Pasadena, CA (US) 91107

( * ) Notice: Subject to any disclaimer, the term of this patent is extended or adjusted under 35 U.S.C. 154(b) by 1815 days.

(21) Appl. No.: 10/856,649

(22) Filed: May 28, 2004

Related U.S. Application Data

(60) Provisional application No. 60/474,701, filed on May 30, 2003.

(51) Int. Cl.
*G06F 17/60* (2006.01)
(52) U.S. Cl. ...................................................... 705/11
(58) Field of Classification Search .................... 705/11
See application file for complete search history.

(56) References Cited

U.S. PATENT DOCUMENTS

| | | | | |
|---|---|---|---|---|
| 6,115,691 | A * | 9/2000 | Ulwick ........................... | 705/7 |
| 6,119,097 | A * | 9/2000 | Ibarra ............................ | 705/11 |
| 6,604,084 | B1 * | 8/2003 | Powers et al. .................. | 705/11 |
| 2004/0088177 | A1 * | 5/2004 | Travis et al. .................... | 705/1 |

OTHER PUBLICATIONS

Deborah et al "Designing Effective performance appraisal system", Dec. 1997, Work study vol. 46, pp. 197-201.*

Piatt "Analysis of Municipal Government Performance Appraisal System", Dec. 1998, Texas State University Dept of Politicasl Science, pp. 1-102.*

Kane (Accuracy and Its Determinants in Distributional Assessment), Jan. 2000, Human Resources, vol. 13, Issue 1.*

Newman et al (Job Performance Ratings), Dec. 1998, pp. 1-17.*

* cited by examiner

*Primary Examiner*—Romain Jeanty
(74) *Attorney, Agent, or Firm*—Christie, Parker & Hale, LLP

(57) ABSTRACT

A distributional assessment system for assessing the job performance of individuals within an organization. A rater, uses the distributional assessment system to rate the performance of a ratee, such as an employee. The distributional assessment system guides the rater through a job function description process to generate a set of assigned weights and a best feasible performance rating. The weights and best feasible performance rating are used along with an actual performance rating to generate an overall distributional assessment of the ratee. The ratee may use the weights and distributional assessment to determine the lowest cost path to improving personal job performance. In addition, an organization can use aggregate distributional assessments to determine the overall performance rating of an organization and determine the lowest cost path to improving the organization's performance. Individual distributional assessments and new job function weights may be used to identify the most likely candidates for a job promotion.

20 Claims, 16 Drawing Sheets

Performance Sickness Assessment

XYZ Corporation

Ratee:
Name: Larry Amundsen
I.D. Number: 1064

Rater:
Name: Bernie Fewell
I.D. Number:

Assigned Job Functions:

| Status | Job Functions & Dimensions |
|---|---|
| BF | Planning and Organizing |
| C |   Quality |
| BF |   Timeliness |
|  | Delegating |
| BF |   Quality |
|  |   Timeliness |
|  |   Interpersonal Impact |
| BF | Guiding, directing, and motivating subordinates and providing |

Status Key:
[Blank] = Not yet rated
[BF] = Best Feasible Rating completed and locked
BF = Best Feasible Rating completed but can be changed
C = Ratings completed

Assessment of Actual Performance

Performance Dimension:
Quality in Planning and Organizing

Think back over all the times when you observed, or otherwise became aware, that this ratee had the opportunity to... develop short- and/or long-term plans and arranging for the resources to carry them out On what percentage of these occasions did the ratee ACTUALLY produce this level of QUALITY:

Produced an outcome that was at the lowest level of accuracy and completeness that could be accepted under normal circumstances without having to be relieved of further responsibility for this function.

Enter a percentage:

0 5 10 15 20 25 30 35 40 45 50 55 60 65 70 75 80 85 90 95 100

5 %

Then, press Enter

Actual Distribution

| Level: | | Percent: |
|---|---|---|
| 5 | Most nearly perfect | % |
| 4 | | % |
| 3 | (Midrange) | % |
| 2 | | % |
| 1 | (Lowest tolerable) | % |

Sum = 100%

[DONE]

[SUSPEND]

Click to save dimensions rated up to this point so you can resume later

[Help]

FIG. 5

XYZ Corporation

Assessment of Actual Performance

Ratee:
Name: Larry Amundsen
I.D. Number: 1064

Rater:
Name: Bernie Fewell
I.D. Number:

Performance Dimension:

Quality in Planning and Organizing

Think back over all the times when you observed, or otherwise became aware, that this ratee had the opportunity to... develop short- and/or long-term plans and arranging for the resources to carry them out On what percentage of these occasions did the ratee ACTUALLY achieve this level of QUALITY:

BETTER THAN LEVEL 3
Produced an outcome that was just barely accurate and complete enough to avoid the necessity of correcting its defects.
BUT WORSE THAN LEVEL 5
Produced an outcome that reached the highest level of accuracy and completeness that anyone could ever achieve, completely free of defects Enter a percentage:

0 · 5 · 10 · 15 · 20 · 25 · 30 · 35 · 40 · 45 · 50 · 55 · 60 · 65 · 70 · 75 · 80 · 85 · 90 · 95 · 100

21 %

Then, press [ Enter ]

Assigned Job Functions:

| Status | Job Functions & Dimensions |
|---|---|
| BF | Planning and Organizing |
| | Quality |
| C | Timeliness |
| BF | Delegating |
| | Quality |
| | Timeliness |
| | Interpersonal Impact |
| BF | Guiding, directing, and motivating subordinates and providing |

Status Key:
(Blank) = Not yet rated
BF = Best Feasible Rating completed and locked
BF = Best Feasible Rating completed but can be changed
C = Ratings completed

Actual Distribution

| Level: | | Percent: |
|---|---|---|
| 5 | Most nearly perfect | 25% |
| 4 | | 21% |
| 3 | (Midrange) | 35% |
| 2 | | 9% |
| 1 | (Lowest tolerable) | 10% |

Sum = 100%

Distribution Adjustment Tool

| Level | Current % | INCREASE highlighted level by taking from... | DECREASE highlighted level by giving to... |
|---|---|---|---|
| 5 | 25% | ▲ | ▼ |
| 4 | 21% | ▲ | ▼ |
| 3 | 35% | ▲ | ▼ |
| 2 | 9% | ▲ | ▼ |
| 1 | 10% | ▲ | ▼ |

[ EXIT ]

[ Help ]

FIG. 6

Performance Science Management

Assessment of Best Feasible Performance

XYZ Corporation

Ratee:
Name: Larry Amundsen
I.D. Number: 1064

Rater:
Name: Bernie Fewell
I.D. Number:

Assigned Job Functions:

| Status | Job Functions & Dimensions |
|---|---|
|  | Planning and Organizing |
|  |  Quality |
|  |  Timeliness |
| BF | Delegating |
| BF |  Quality |
| BF |  Timeliness |
| BF |  Interpersonal Impact |
|  | Guiding, directing, and motivating subordinates and providing |

Status Key:
(Blank) = Not yet rated
BF = Best Feasible Rating completed and locked
BF = Best Feasible Rating completed but can be changed
☑ = Ratings completed

Performance Dimension:
Timeliness in Planning and Organizing

Think back over all the times when you observed, or otherwise became aware, that this ratee had the opportunity to...
develop short- and/or long-term plans and arranging for the resources to carry them out On what percentage of these occasions was there no way to achieve better TIMELINESS than this:

Missed the deadline for completing the performance of this function by the widest margin that could be tolerated under normal circumstances without having to be relieved of further responsibility for this function.

Enter a percentage:
0 5 10 15 20 25 30 35 40 45 50 55 60 65 70 75 80 85 90 95 100

0 %

Then, press  Enter

Best Feasible Distribution

| Level: |  | Percent: |
|---|---|---|
| 5 | Most nearly perfect | % |
| 4 |  | % |
| 3 | (Midrange) | % |
| 2 |  | % |
| 1 | (Lowest tolerable) | % |

Sum = _____ 100%

DONE

SUSPEND
Click to save dimensions rated up to this point so you can resume later.

Help

FIG. 7

XYZ Corporation

Ratee:
Name: Larry Amundsen
I.D. Number: 1064

Rater:
Name: Bernie Fewell
I.D. Number:

Assigned Job Functions:

| Status | Job Functions & Dimensions |
|---|---|
| BF | Planning and Organizing |
|  |   Quality |
|  |   Timeliness |
|  | Delegating |
| BF |   Quality |
| BF |   Timeliness |
| BF | Interpersonal Impact |
|  | Guiding, directing, and motivating subordinates and providing |

Status Key:
- (Blank) = Not yet rated
- BF (highlighted) = Best Feasible Rating completed and locked
- BF = Best Feasible Rating completed but can be changed
- C = Ratings completed

Assessment of Best Feasible Performance

Performance Dimension:

Quality in Planning and Organizing

Think back over all the times when you observed, or otherwise became aware, that this ratee had the opportunity to... develop short- and/or long-term plans and arranging for the resources to carry them out On what percentage of these occasions was this the best that anyone could have achieved on QUALITY:

BETTER THAN LEVEL 3
Produced an outcome that was just barely accurate and complete enough to avoid the necessity of correcting its defects.
BUT WORSE THAN LEVEL 5
Produced an outcome that reached the highest level of accuracy and completeness that anyone could ever achieve, completely free of defects

Enter a percentage:

0 . 5 . 10 . 15 . 20 . 25 . 30 . 35 . 40 . 45 . 50 . 55 . 60 . 65 . 70 . 75 . 80 . 85 . 90 . 95 . 100

[ 18 % ]

Then, press [Enter]

Best Feasible Distribution

| Level: |  | Percent: |
|---|---|---|
| 5 | Most nearly perfect | 50% |
| 4 |  | 18% |
| 3 | (Midrange) | 20% |
| 2 |  | 7% |
| 1 | (Lowest tolerable) | 5% |

Sum = 100%

Distribution Adjustment Tool

| Level | Current % | INCREASE highlighted level by taking from... | DECREASE highlighted level by giving to... |
|---|---|---|---|
| 5 | 50% | -1 | +1 |
| 4 | 18% | +1 | -1 |
| 3 | 20% | -1 | +1 |
| 2 | 7% | -1 | +1 |
| 1 | 5% | -1 | +1 |

[EXIT]   [Help]

FIG. 8

Appraisal Content Specifier

Ratee name: Larry Amundsen

Ratee I.d. number: 1064

Click here to use the functions that were used in this ratee's last appraisal.

Click here to select functions specific to the ratee's job.

Optionally, you may select functions the ratee performed in other jobs in the organization:

Show: *Generic Manager

Organizational Job Functions
- Staffing
- Persisting to reach goals
- Handling crises and stress
- Organizational commitment
- Monitoring and controlling resources
- Selling and influencing
- Collecting and interpreting data

[View Definition]  [Close]

Job functions on which this ratee's performance will be appraised.
- Planning and Organizing
- Delegating
- Guiding, directing, and motivating subordinates and providing feedback
- Decision-making and problem-solving To remove an entry, click on it, then press your [Delete] key.

FIG. 9

Appraisal Control Center

Rater name: |Bernie Fewell|

Appraisal Schedule

| Status | People you are responsible for appraising | Appraisal due date |
|---|---|---|
|  | Larry Amundsen | 11/15/2003 |
| R | Jim Jackson | 11/15/2003 |
| R | Claire Chancellor | 11/30/2003 |
| R | Juanita Gomes | 11/30/2003 |

Status key:

- R = Ready to be rated; you are the sole rater.
- RS = Ready to be rated; you are the supervising rater.
- RP = Ready to be rated; you are a participating rater.
- RBF = Ready to rate your own Best Feasible performance
- JF = Selection of job functions COMPLETED
- □ = Weighting of job functions COMPLETED
- BF = Best Feasible ratings COMPLETED but REVISABLE.
- □ = Best Feasible ratings COMPLETED and LOCKED.
- C = Appraisal COMPLETED and ready to be scored.
- ✕ = Completed ratings have been submitted for scoring.
- SBF = Ratings of Best Feasible performance SUSPENDED
- SA = Ratings of Actual performance SUSPENDED.
- P = current performance period in progress.
- ■ = New in job, only scheduling permitted.

Select action for highlighted ratee:

| | |
|---|---|
| Specify | Specify job functions to be included in the appraisal of this ratee. |
| Weight | Assign relative weights to the job functions selected for this ratee. |
| Multi-Source | Arrange for multiple raters to participate in the appraisal of this ratee |
| Rate BF | Rate Best Feasible Performance on the selected job functions. |
| Rate Actual | Rate Actual performance on the selected job functions |
| Resume | Resume the appraisal that was suspended for this ratee. |
| Score | Score the completed ratings for this ratee. |
| GainPlan | Request that a GainPlan be prepared for and sent to this ratee. |
| Cancel | Cancel this person's appraisal. |
| Reschedule | Change the date of the next appraisal for any of your direct reports. |
| Exit | End this appraisal session |

DISTRIBUTIONAL ASSESSMENT SYSTEM

CROSS-REFERENCE TO RELATED APPLICATION

This application claims the benefit of provisional application No. 60/474,701, filed May 30, 2003, the entire disclosure of which, including Appendices A through H, is incorporated herein by this reference.

FIELD OF THE INVENTION

This invention relates generally to assessing individual job performance within an organization and more specifically to optimizing an individual's job performance using individual performance assessments and optimizing an organization's performance using aggregated individual performance assessments.

BACKGROUND

Previous approaches to the assessment of work performance are based on a measurement model borrowed from the physical sciences that assumes all variation around a true value of an attribute is because of random measurement error. This may not be the case for work performance assessments. The level of performance exhibited on any given aspect of any job function may be determined by a combination of fixed abilities and the variable factors of personal motivation and situational constraints.

The failure of measurement models in conventional use to account for the non-error nature of variability in performance has led to appraisal methods that may be deficient in their coverage of the ways in which performances are differentiated. In addition, these appraisal methods may be deficient in that they are unable to restrict the range of performance for which workers are held accountable to that which is feasible to achieve. The latter deficiency, in addition to being a major source of unfairness in conventional appraisals, prevents conventional appraisal scores from being commensurate between job functions, jobs, or between the elements of any level to which job performance scores may be aggregated.

As a result of these and related deficiencies, dissatisfaction with conventional appraisal methods has been reported to be widespread among organizations in repeated surveys over the last 15 years. Therefore, a need exists for an appraisal method that overcomes some of the major deficiencies in conventionally used appraisal methods. Various aspects of the present invention meet such a need.

SUMMARY OF THE INVENTION

One aspect of the invention comprises a distributional assessment system for assessing the job performance of individuals within an organization. A rater, such as a supervisor, uses the distributional assessment system to rate the performance of a ratee, such as an employee. The distributional assessment system guides the rater through a process to designate the job functions to be included in the appraisal of the employee, to generate the relative weights of the designated functions, and to specify the best feasible and actual performance distributions for each of the aspects of value associated with each of the designated job functions. There are multiple aspects of value from which a subset is designated during the system installation process to be used in the rating of performance on each job function. These aspects include: quality, quantity, timeliness, cost effectiveness, need for supervision, and interpersonal impact. These inputs are used to generate distributional assessments of each aspect of value-job function combination, for each job function across all of its associated aspects of value, for each aspect of value across all of the job functions with which it is associated, and for the ratee's job as a whole. The availability of this data then makes it possible to target a higher overall performance level to be achieved during the forthcoming period of performance and to generate a report, called a GainPlan™, that conveys the most effort-efficient path of achieving the targeted performance level.

In addition, another procedure called Performance Enhancement Planning™ may be conducted which targets a higher level of aggregate performance for the whole organization, or for any of its subdivisions, and generates a report conveying the most effort-efficient path to achieving the targeted level of aggregate performance. A procedure called the Performance-Based Internal Selection System (PerBISS™) can be enacted which uses past individual distributional assessments on each of the multiple aspects of value and the weights of the aspects of value in a job to be filled to generate predicted performance scores of candidates for the job to be filled.

In another aspect of the invention, job functions for inclusion in the appraisal of an employee's work performance are designated. Three different categories of job functions are available for inclusion: job functions specific to the ratee's job; job functions associated with any of the other jobs in the ratee's organization; and functions associated with any of several hundred generic occupations available for consideration. Once job functions are designated, job function weighting allows the weighting of each selected job function on the basis of the change in overall job performance that would result from the maximum swing in the effectiveness with which the function was performed.

In another aspect of the invention, the inputs of others besides an immediate supervisor may be included in the rating of an employee's performance on each of the job functions designated for inclusion in the employee's appraisal. This ensures that an appraisal's coverage of the occasions when the ratee performed each job function will be adequate. Different sets of raters may be designated for each job function and the raters within each set may be differentially weighted.

In another aspect of the invention, a rater is guided through a series of questions to elicit his/her best estimates of the percentages of performance opportunities when the lowest, middle, and highest outcome levels were the best that could have been achieved by a ratee. The percentages for the second lowest and second highest outcome levels are then filled in by a curve smoothing process. After the percentages for all of the outcome levels have been initially estimated, clicking on any level in a computer-implemented distributional summary display will make visible the distributional adjustment tool. This tool enables the rater to make any adjustments desired to the initially estimated best feasible distribution. This process generates a representation of a best feasible performance distribution. The rater then inputs percentage estimates referring to a percentage of performance opportunities on which the ratee actually achieved each of the specified outcome levels for each aspect of value-job function combination. The rater's inputs during this step are automatically constrained to conform to the limits imposed by the previously entered best feasible distribution. This produces a representation of the actual performance distribution for each aspect of value-job function combination. A performance assessment of the ratee is generated using a mathematical algorithm to express the proximity of the actual distribution to the best feasible distribution in percentage terms.

In another aspect of the invention, a user (rater or ratee) is presented with the level of overall performance the ratee achieved on his/her last performance appraisal. The user is then asked to enter the overall performance level that the ratee will attempt to achieve during the forthcoming appraisal period. This information is then used to generate a performance improvement plan (herein termed a GainPlan™) which conveys the performance improvements that must be achieved on an optimally targeted subset of job function-aspect of value combinations in order to achieve the targeted gain in overall job performance.

These and other features, aspects, and advantages of the present invention will become better understood by referring to the following detailed description and accompanying drawings.

BRIEF DESCRIPTION OF THE DRAWINGS

FIG. 5 is a screen capture of a startup screen for an actual performance distributional assessment system in accordance with an embodiment of the present invention.

FIG. 6 is a screen capture showing input data for the distributional assessment system screen of FIG. 5 in accordance with an embodiment of the present invention.

FIG. 7 is a screen capture of a startup screen for a distributional assessment system best feasible distribution reporting screen in accordance with an embodiment of the present invention.

FIG. 8 is a screen capture showing input data for the best feasible distribution reporting screen of FIG. 7 in accordance with an embodiment of the present invention.

FIG. 9 is a screen capture distributional assessment login screen in accordance with an embodiment of the present invention.

FIG. 10 is a screen capture of a distributional assessment system appraisal control center in accordance with an embodiment of the present invention.

Figure 12:
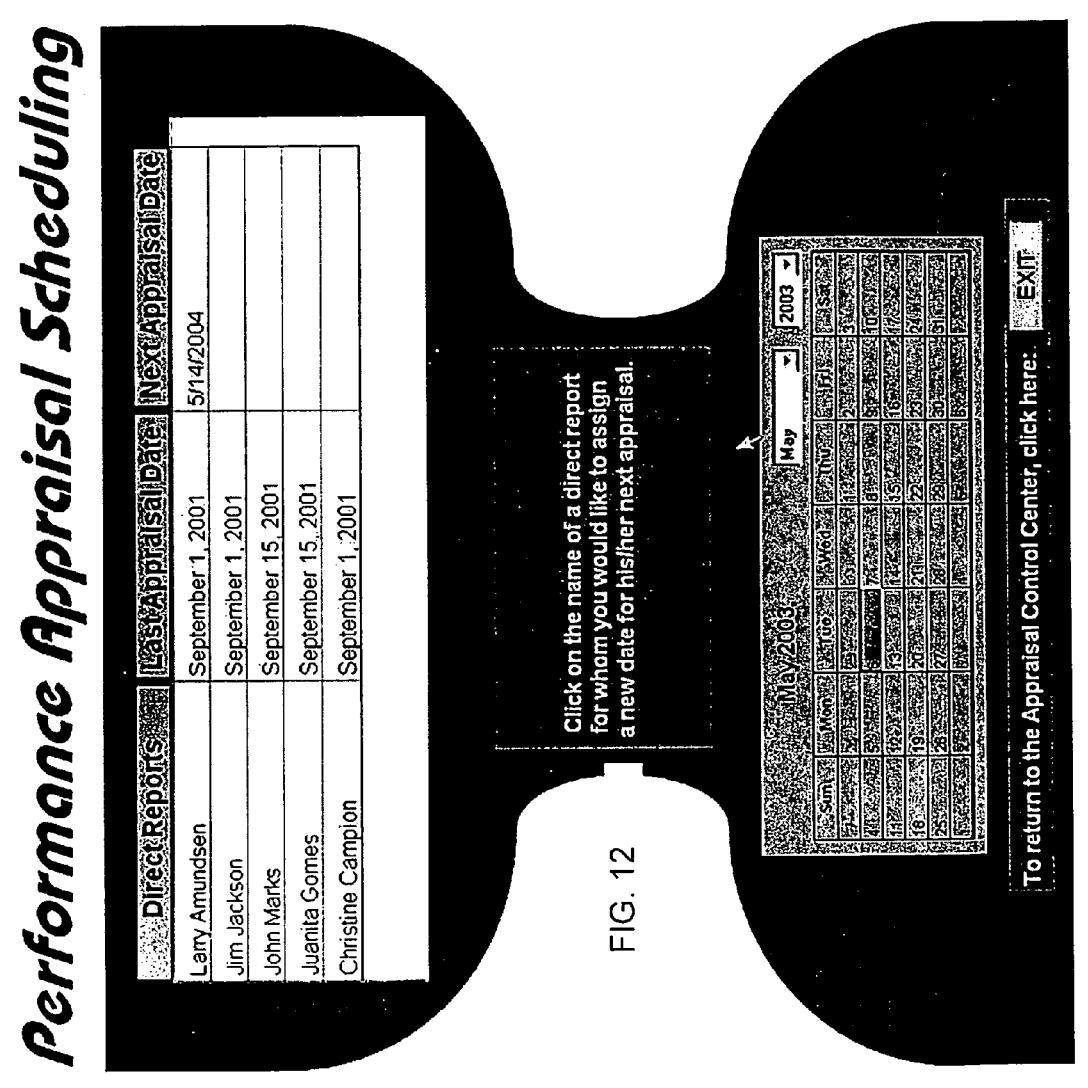

FIG. 12 is a screen capture of a distributional assessment system appraisal scheduling screen in accordance with an embodiment of the present invention.

FIG. 13 is a screen capture of a distributional assessment system multisource selection screen in accordance with an embodiment of the present invention.

DETAILED DESCRIPTION

Figure 1:
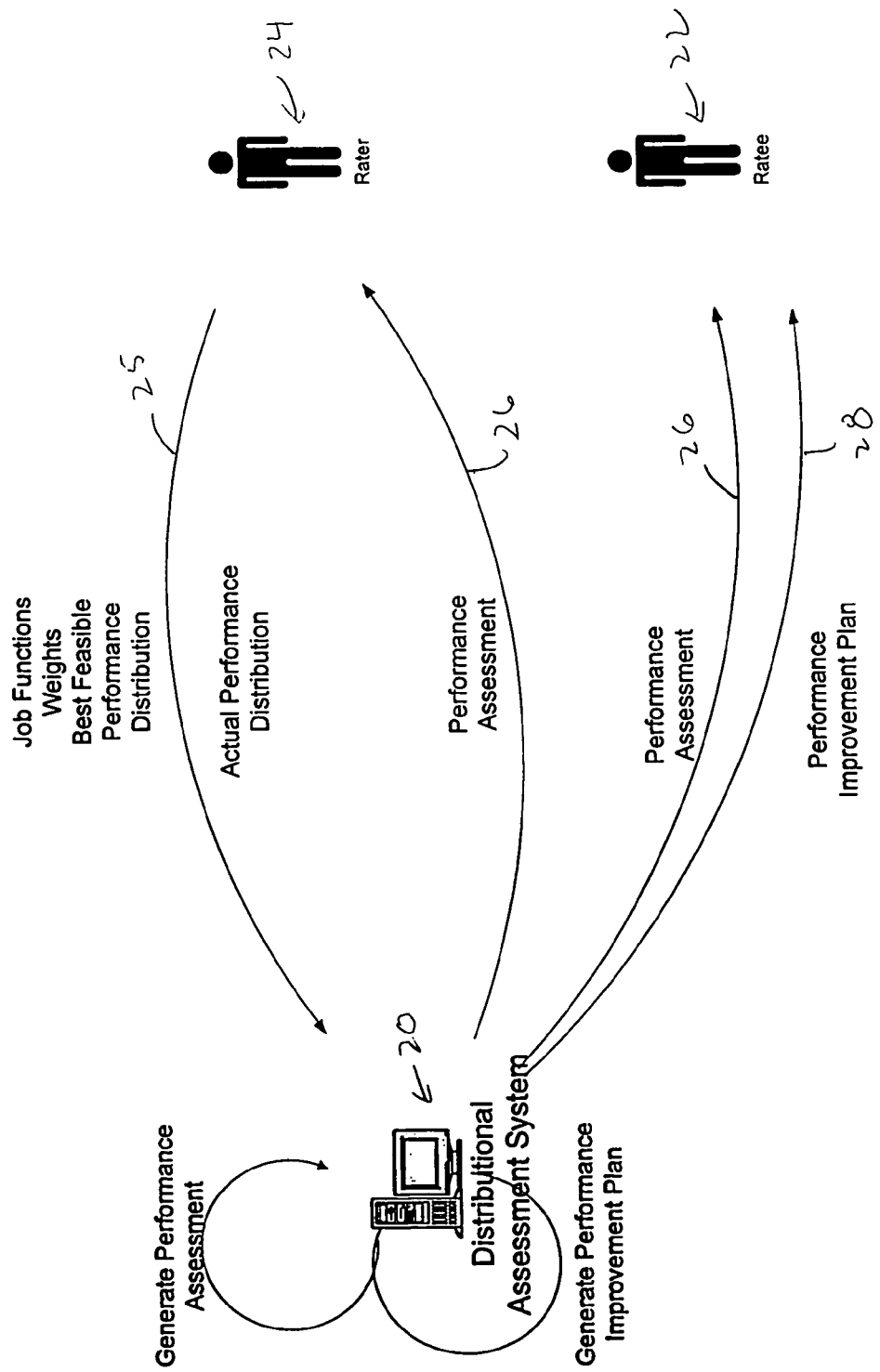
FIG. 1 is a block diagram of a distributional assessment system in accordance with an exemplary embodiment of the present invention.

FIG. 1 is a block diagram of a distributional assessment system in accordance with an embodiment of the present invention. Setup information is provided to a computer-operated distributional assessment program (described below) contained in a distributional assessment system 20. A person whose performance is to be assessed, called a ratee, is shown at 22. A person who assesses job performance, called a rater, is shown at 24. The setup information includes descriptions of job functions, identifiers of individuals performing the job functions whose performance will be assessed, herein the ratee 22, and identifiers of individuals who will be assessing the performance of the ratees, herein the rater 24.

During the setup process, the aspects of value salient to each job function are determined and the relative weight each of a job function's aspects of value will have in the computation of the overall score on the respective job function is established.

During the assessment process, weights for each of the assessed job functions are generated. For example, if a job function is considered the most important job function of a ratee, it is given a higher weight in the performance assessment than other job functions. As the rater may not be a professional in the field of performance assessment, the distributional assessment system guides the rater through the weighting function generation process by asking a series of questions about each job function. At the end of the process, a set of weights is established that will be used when assessing the performance of the ratee 22. In addition the weights will also be used to help a ratee determine the best course of action to be taken to improve the ratee's performance assessment at a later date. The setup information and weights are stored by the program for later use.

Once the rater 24 has completed the setup phase, the rater accesses the system and supplies ratings of the ratee's performance in the ratee's related job functions. This is shown as the actual performance distribution 25. Again, as the rater may not be a performance assessment professional, the performance distribution assessor guides the rater through the rating process by asking a series of questions about the ratee's performance for the ratee's related job functions. The performance distribution assessor 20 uses the ratings and the weights to generate a performance assessment 26 that may be transmitted and accessed through the Internet by the rater and ratee for their use and edification.

The ratee 22 may also access the performance distribution assessor via the Internet to generate a performance improvement plan 28, known as a GainPlan™, that the ratee may use to improve his or her performance. The performance improvement plan is generated using the ratings, and the weights for the job functions performed by the ratee. However, instead of only assessing the ratee's performance, the performance improvement plan shows the areas where the ratee should focus their efforts in order to achieve a better performance assessment. For example, if the ratee did moderately well in a first job function rating but very poorly in a second job function rating, it may appear that the ratee should focus their efforts in improving their performance in the second job function. However, if the first job function has a higher weight than the second job function, then the ratee may be best served by focusing their efforts on the first job function to raise its rating even higher. The performance improvement plan provides a ratee with just such a recommendation.

Figure 2:
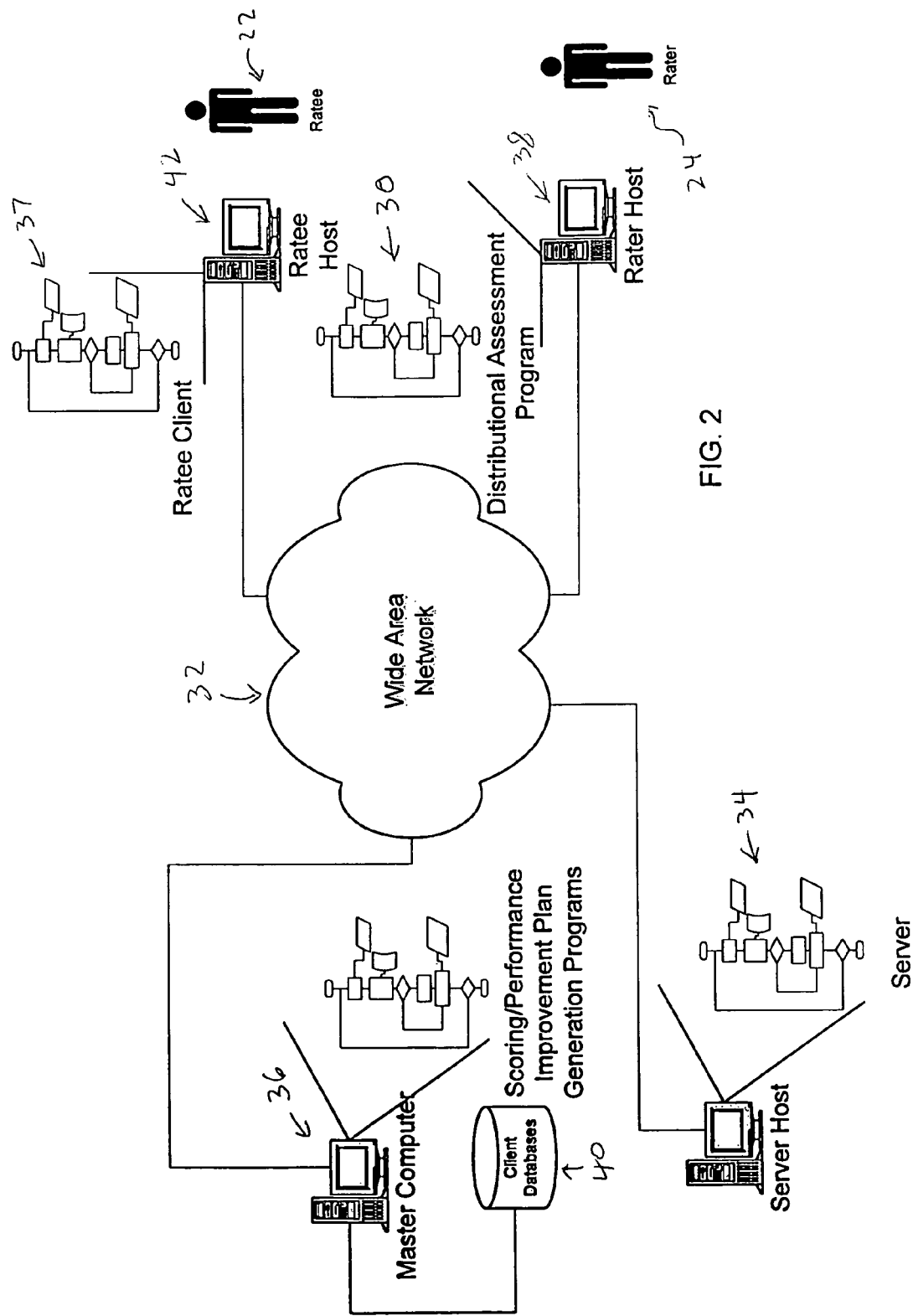
FIG. 2 is a deployment diagram of a distributional assessment system in accordance with an embodiment of the present invention.

FIG. 2 is a deployment diagram of a distributional assessment system in accordance with an embodiment of the present invention. The system includes a distributional assessment program 30 for conducting distributional assessments, coupled to a communications network 32, the distributional assessment service provider's server 34, the distributional assessment service provider's master computer 36, and the ratee client's performance assessment program 37. The distributional assessment program resides on the local workstations of an organization in which the system is being used in the form of an Activex™ control. This program downloads and uploads data to the distributional assessment service provider's server 34 via the communications network 32 at various stages of the assessment process. Through a series of screens, the rater 24 is prompted to input the appropriate information and the program stores the rater's inputs in a datafile on the rater's host computer 38. As the distributional assessment system may service many different organizations, the database located on the service provider's server includes separate client database areas 40 for each organization.

Once the rater 24 has completed entry of the appropriate information, the data reside in a database table located on the assessment service's server 34. The master computer 36 accesses the stored information and generates a performance assessment using a scoring program. The performance assessments are then stored in the database for later access and notification of the availability of the results for viewing are emailed directly to the rater and the ratee. To generate a performance improvement plan, the rater or ratee within the distributional assessment program clicks on the GainPlan™ button. The program accesses the server-based database and retrieves the ratee's overall score on his/her last appraisal and then displays this score on the GainPlan™ screen. The user is then requested to enter a target performance score for the next appraisal period. After entering this information and clicking on the button that signals the program to proceed, the target score is uploaded to a database table on the server. The master computer 36 monitors the table and when it finds a GainPlan™ request flag, it reads the request record and generates the GainPlan™ performance improvement plan. The completed plan is then made available for viewing by the ratee and his/her rater at a website designed for this purpose. Notification of the availability of the report for viewing is transmitted to the rater and ratee via email.

Figure 3:
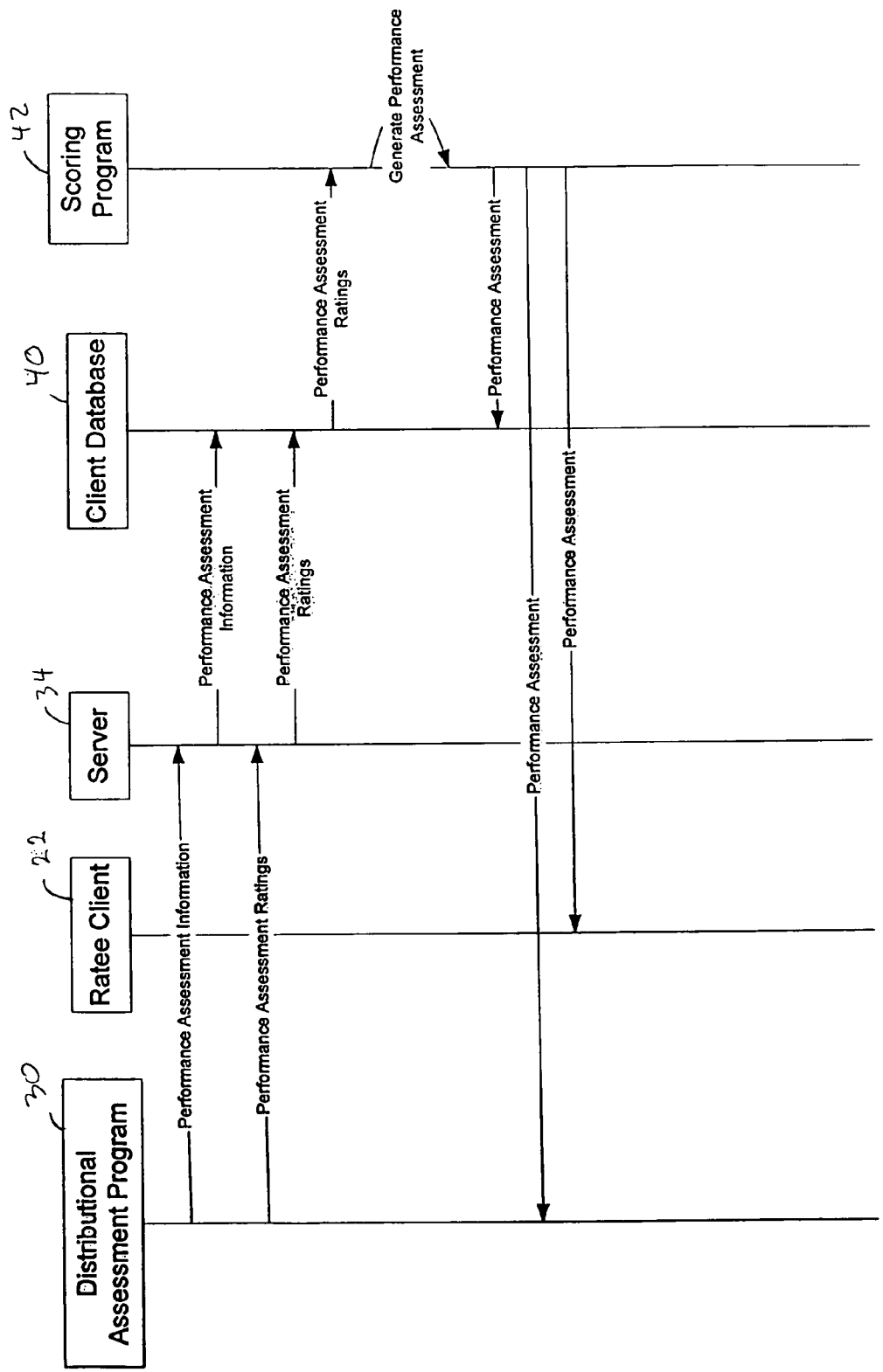
FIG. 3 is a sequence diagram of a performance assessment process in accordance with an embodiment of the present invention.

FIG. 3 is a sequence diagram of a distributional assessment process in accordance with an embodiment of the present invention. In slightly more detail than above, a rater performs the distributional assessment process on a client-side workstation. The raw rating data are stored during this process in a database table on the service provider's server. The service provider's master computer monitors the table containing raw rating data on the server, and upon detecting that a set rating is ready to be scored, proceeds to score the data in the record awaiting scoring, to store the appraisal data in the service provider's database, to notify the rater and ratee of the availability of the results for viewing, and to transmit the appraisal data to the client for storage in the client's database.

The assessment process consists of reporting the percentages that form the best feasible and actual performance distributions for each "aspect of value" on which the performance of each job function has been designated to be assessed. "Aspects of value" refer to a set of separate criteria on which the value of performance on any job function can potentially vary. These include: quality, quantity, timeliness, cost effectiveness, need for supervision, and interpersonal impact. Thus, rather than assessing best feasible and actual performance on a job function as a whole, the assessment is focused on each aspect of value that is relevant to each job function. For example, instead of assessing performance on decision-making as a whole, performance would be separately assessed on the quality of decision-making, timeliness of decision-making, and interpersonal impact in decision-making. Each such combination of a job function and an aspect of value is hereafter referred to as a "performance dimension." (Note that the specific aspects of value on which each job function is to be assessed are determined during the system installation and are not subject to being overridden during the actual use of the system by raters and ratees.)

To elicit the report of a best feasible performance distribution, the distributional assessment program initially presents the rater with a description of the performance dimension in the following format:

"Think back over all the times when you observed or otherwise became aware that this ratee had the opportunity to . . . (an action phrase describing the process of carrying out the specified job function)."

Then the rater is presented with the task of responding to three questions addressed to the lowest (Level 1), middle (Level 3), and highest (Level 5) outcome/behavior levels of each performance dimension being used in an employee's appraisal. A ratee's actual performance is reported in the same way, except that the questions eliciting responses for the three outcome levels are phrased to specify actual performance.

Once the best feasible performance and actual performance ratings are completed, they are stored in a database system, for further processing by a scoring program 42. The scoring program accesses the datastore and generates a performance assessment using the best feasible performance and actual performance ratings, the job function weights, and aspect of value of weights. The performance assessment scores are then stored in the datastore. When the rater, ratee, or other authorized party selects a report for viewing at a website designed for this purpose, the report is created and displayed on the user's web browser. The HTML and ASP files containing the report sections are created as temporary files on the assessment service provider's server and are deleted at the end of each viewing session. The navigation frame of the report viewing contains a hyperlink that causes a printable version of the section currently being viewed to be displayed in the user's web browser. In addition, database entries of the complete assessment results are generated for the service provider's database and for the client's database.

The process used to score the proximity of actual to best feasible performance distributions is described in APPENDIX A of the referenced provisional application 60/474,701, also included with this application as APPENDIX A.

Figure 4:
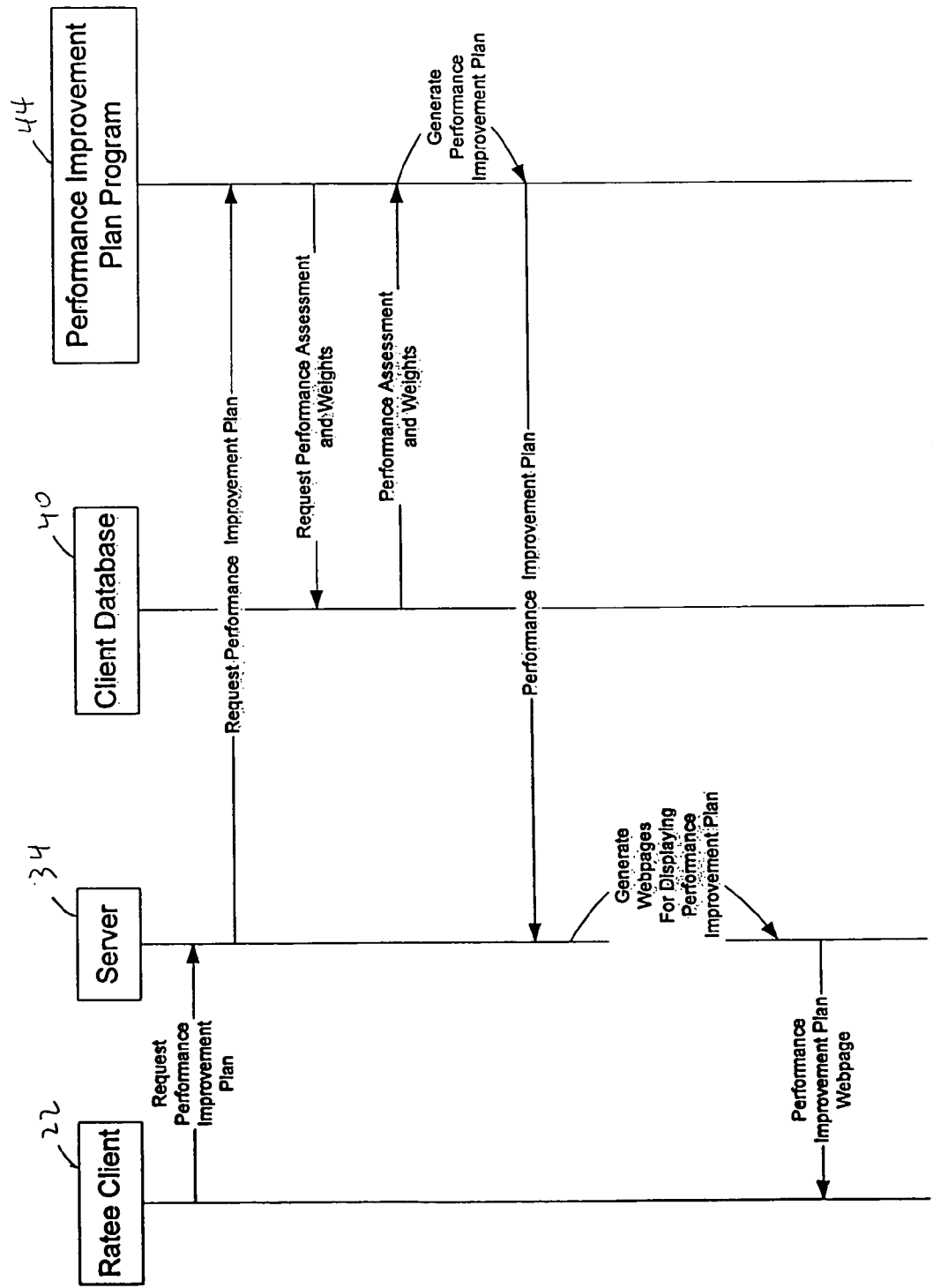
FIG. 4 is a sequence diagram of a performance improvement plan generation process in accordance with an embodiment of the present invention.

FIG. 4 is a sequence diagram of a performance improvement plan (i.e., "GainPlan") generation process in accordance with an embodiment of the present invention. In slightly more detail than above, a ratee or a rater accesses the distributional assessment program 30 on his/her workstation. At the Appraisal Control Center screen the user selects the ratee for whom completed appraisal data exists and then clicks the "GainPlan" button to activate the performance improvement plan program. This program transmits a request to the service provider's database to retrieve the selected ratee's last overall performance score. This information is displayed on the computer screen along with a request to enter a target level of performance to be achieved during the forthcoming performance period. Upon entering this information and clicking a submit button, the target performance level and ratee identifying information is uploaded to a table in the service provider's database. The service provider's master computer monitors this table and, upon detecting a GainPlan request, proceeds to generate a GainPlan report. The performance improvement plan program uses the performance assessment data, job functions, and weighting functions associated with the ratee's last appraisal to generate a performance improvement plan. Notification is then transmitted to the ratee and his/her supervisor via email informing the recipients that the GainPlan™ report is available for viewing at a website designated for this purpose.

As an organization uses the distributional assessment system, the service provider will be building a database of ratee performance appraisals that may be used in a variety of ways to enhance the performance of the entire organization. Performance Enhancement Planning, provided by a Performance Enhancement Plan Program 44, is an additional service provided under the umbrella of the distributional assessment system. For organizations that have implemented the distributional assessment system, it permits targets to be set for the aggregate employee performance of an organization as a whole or of any of its subdivisions. Performance enhancement planning works by first computing the aggregate employee performance of an organization or a subdivision. This is accomplished by computing a weighted average of the overall distributional assessment system performance scores for all employees. The weights used in this process are the pay rates of the individuals. Thus, the performances of higher paid employees have a greater influence on the aggregate score than do those of lower paid employees. Once the aggregate performance score has been computed, representatives of the organization are requested to set a target level to which the aggregate performance is to be raised. The Performance Enhancement Planning Program 44 then proceeds to allocate responsibility for different shares of the gain, subunit by subunit, from the top of the organization downward.

Feasibility enhancement planning is another product under the umbrella of the distributional assessment system. Feasibility Enhancement Planning is an analog of the Performance Enhancement Planning system that focuses on reducing the gap between present and targeted feasibility levels instead of between present and targeted performance levels. "Feasibility level" refers to the proximity of the best feasible distribution to the perfect distribution (i.e., 100% occurrence rate of the highest outcome level), expressed on a zero to 100% scale. The degree to which the feasibility level falls short of 100% reflects the influence of situational constraints beyond the performer s control.

Feasibility enhancement planning works by first computing the aggregate employee feasibility level of an organization or a subdivision. This is accomplished by computing a weighted average of the overall feasibility levels for all employees. The weights used in this process are the pay rates of the individuals. Thus, the feasibility levels of higher paid employees have a greater influence on the aggregate feasibility level than do those of lower paid employees. The overall feasibility level of each position is determined by first computing the weighted average feasibility level within each of an employee's appraised job functions using the normalized raw weights of each function's aspects of value. The weighted average feasibility level for each position is then computed using the normalized raw weights of the job functions. The aggregate feasibility level for the organization is then computed as the pay-weighted average of the feasibility levels of all positions. Once the aggregate feasibility level has been computed, representatives of the organization are requested to set a target level to which the aggregate feasibility level is to be raised. The feasibility plan program then proceeds to allocate responsibility for different shares of the gain, subunit by subunit, and position by position within subunits, from the top of the organization downward.

Performance-based internal selection is an additional service which is offered either as a standalone software program or as a web-based service. It allows a client organization to identify the most qualified internal candidate for a position the organization is seeking to fill. This system capitalizes on the commensurability of scores for all jobs in which performance is assessed through the distributional assessment system. It also capitalizes on the use of the two dimensional framework of aspects of value and job functions as the means of defining appraisal content in all implementations of distributional assessment.

Performance-based internal selection works by first having the organization specify the weights of aspects of value in the job to be filled. These are determined on the basis of prior performance appraisals of incumbents of this target job, and reflect adjustments for the incidence of constraints. Then another weighting factor has to be computed to take account of the degree to which each candidate had the opportunity to exhibit performance on each of the aspects of value in his/her prior jobs that are the source of information on the candidates prior performance.

A more detailed description of the processes used to generate weighting functions, performance assessments, and performance improvement plans is presented in APPENDICES A through H of the provisional application 60/474,701, the contents of which are incorporated by reference as if stated in full herein. FIGS. 5 through 14 are screen captures of a user interface for the distributional assessment system and are fully described in APPENDIX A. The following discussion includes parenthetical references to the various user interface screens.

Upon successful login to the performance assessment system, any employees whom the user is responsible for appraising, by virtue of being either their direct supervisor or a designated participating rater in a multisource appraisal, are displayed in the list of ratees in an appraisal control center (FIG. 10). A listed employee who is either due to be appraised, or is in the process of being appraised, is then selected by clicking his/her name. The initial or next logical step in the appraisal process is signified by activated buttons on the appraisal control center screen.

The first step in this process is the selection of the job functions to serve as the basis for the employee's appraisal (FIG. 9). These may be selected from three categories: functions specific to the ratee's job, functions specific to any other job in the organization, and functions specific to any generic occupation in a list of several hundred. The definition and associated aspects of value may be viewed for any function.

Figure 14:
FIG. 14 is a screen capture of a distributional assessment system job function weighting screen in accordance with an embodiment of the present invention.

Next, the rater is required to weight the selected job functions (FIG. 14). For example, if a job function is considered the most important job function of a ratee, it is given a higher weight in the performance assessment than other job functions. The program guides the rater through the weighting process by asking a series of questions about each job function. At the end of the process, a set of weights is established that will be used when scoring the performance of the ratee. In addition, the weights are also used subsequent to the appraisal in the procedure for determining the best course of action to be taken to improve the ratee's future performance. As each step in the appraisal process is completed, its result's are stored for later use in the appraisal procedure and in the scoring procedure.

Figure 13:
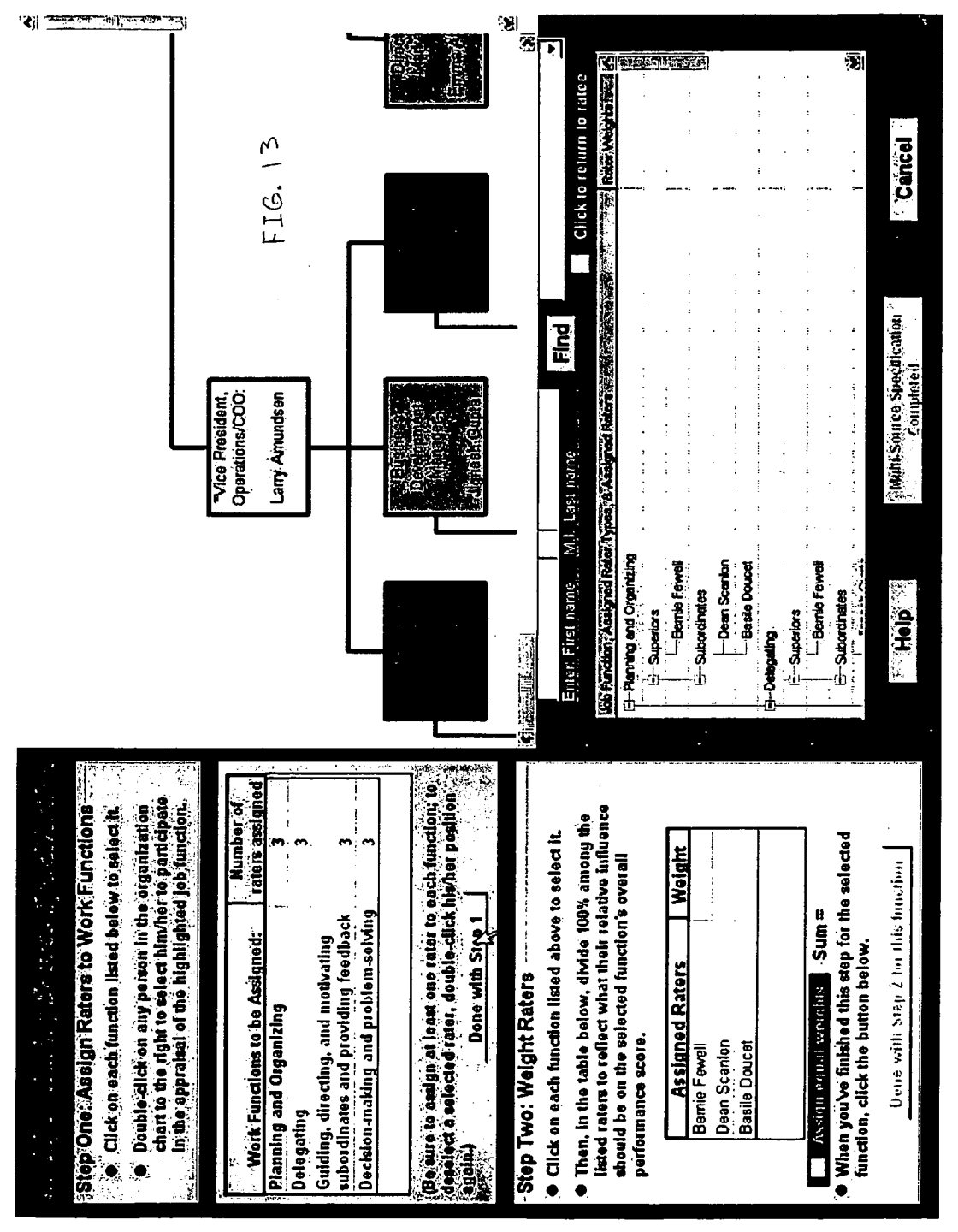

If the rater is the employee's immediate supervisor, he/she is then offered the option of including other persons in the organization to act as participating raters in the ratee's appraisal (FIG. 13). This process consists of selecting the people to participate in the rating of each job function by double-clicking each of their names in the organization chart. Then, differential weights are assigned to the people in the set of raters selected for each job function. Participating raters are automatically notified and reminded of their responsibility via email.

Whether or not the rater chooses to utilize multiple raters (this option is only available for ratees who are direct reports of the rater), the next step in the process consists of reporting the percentages that form the best feasible distribution for each aspect of value-job function combination (FIGS. 5 and 6). The rater is guided through this process by a series of prompting questions, and responses are restricted to those falling within logical limits.

This step is followed by the reporting of the percentages that form the actual distribution for each aspect of value-job function combination (FIG. 5). This step employs the same question-answer procedure (using questions focused on actual rather than best feasible performance), the only structural difference being that in this case the rater's responses are restricted to those falling within the limits imposed by the best feasible distribution in combination with any previously reported actual distribution percentages. After the completion of this step for all aspects of value for all job functions, the raw appraisal data are ready for scoring. The scoring process is initiated by clicking the "score" button on the Appraisal Score Center Screen. When scoring is completed, the rater and ratee are notified via email of the availability of the score report for viewing.

Figure 11:
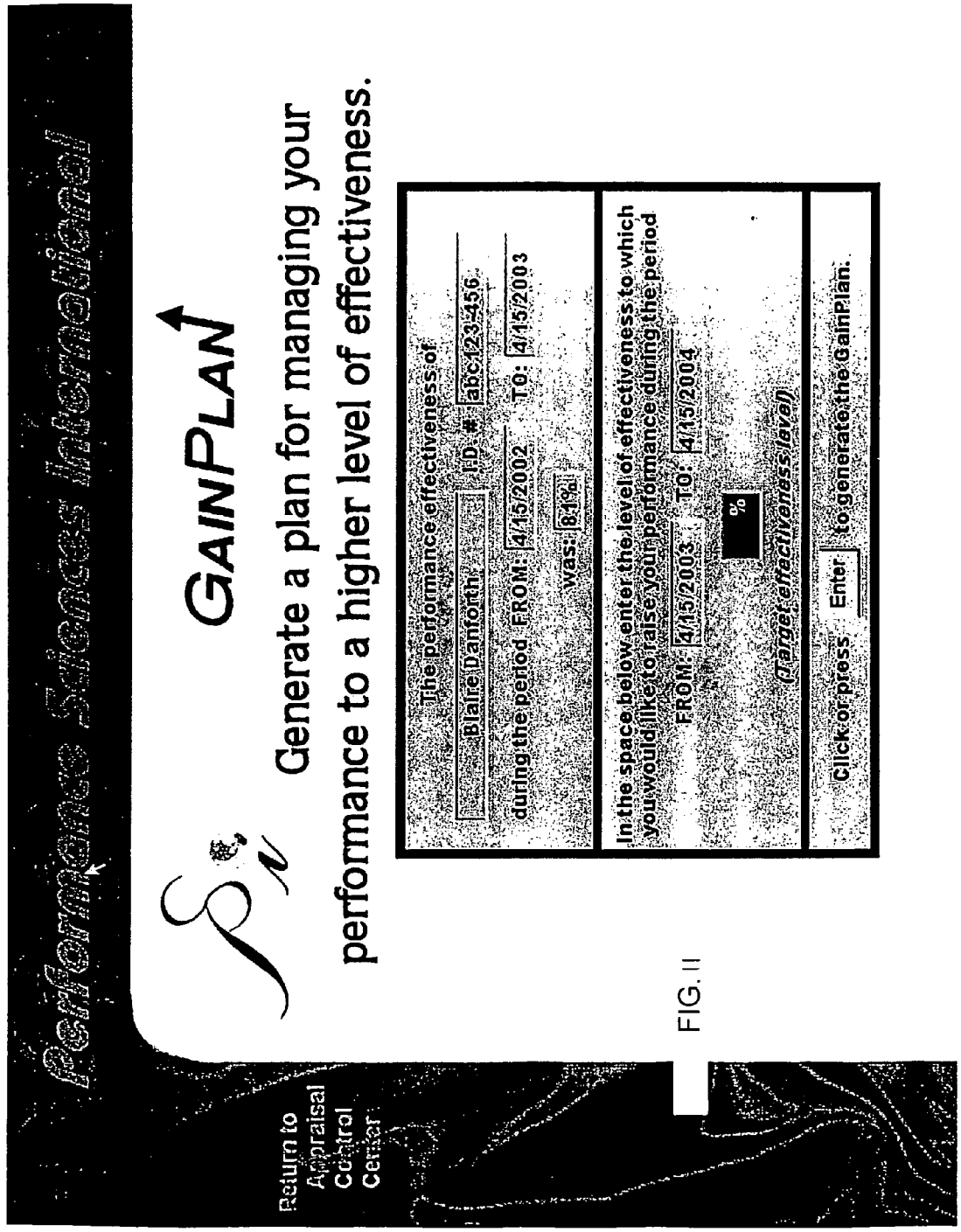
FIG. 11 is a screen capture of a distributional assessment system GainPlan™ specification screen in accordance with an embodiment of the present invention.

The rater or ratee may also access the distributional assessment program to generate a performance improvement plan, known as a GainPlan™, that the ratee may use to improve his/her performance (FIG. 11). The performance improvement plan is generated using the appraisal scores, the reported best feasible and actual performance distributions, and the weights for the job functions and for the aspects of value within the job functions. The GainPlan™ program shows the areas where the ratee should focus his/her efforts in order to achieve a better performance assessment in the forthcoming appraisal period. For example, if the ratee did moderately well in a first job function rating but very poorly in a second job function rating, it may appear that the ratee should focus on improving his/her performance in the second job function. However, if the first job function has a higher weight than the second job function, then the ratee may be best served by focusing on the first job function to raise its rating even higher. The performance improvement plan provides a ratee with just such a recommendation.

Figure 15:
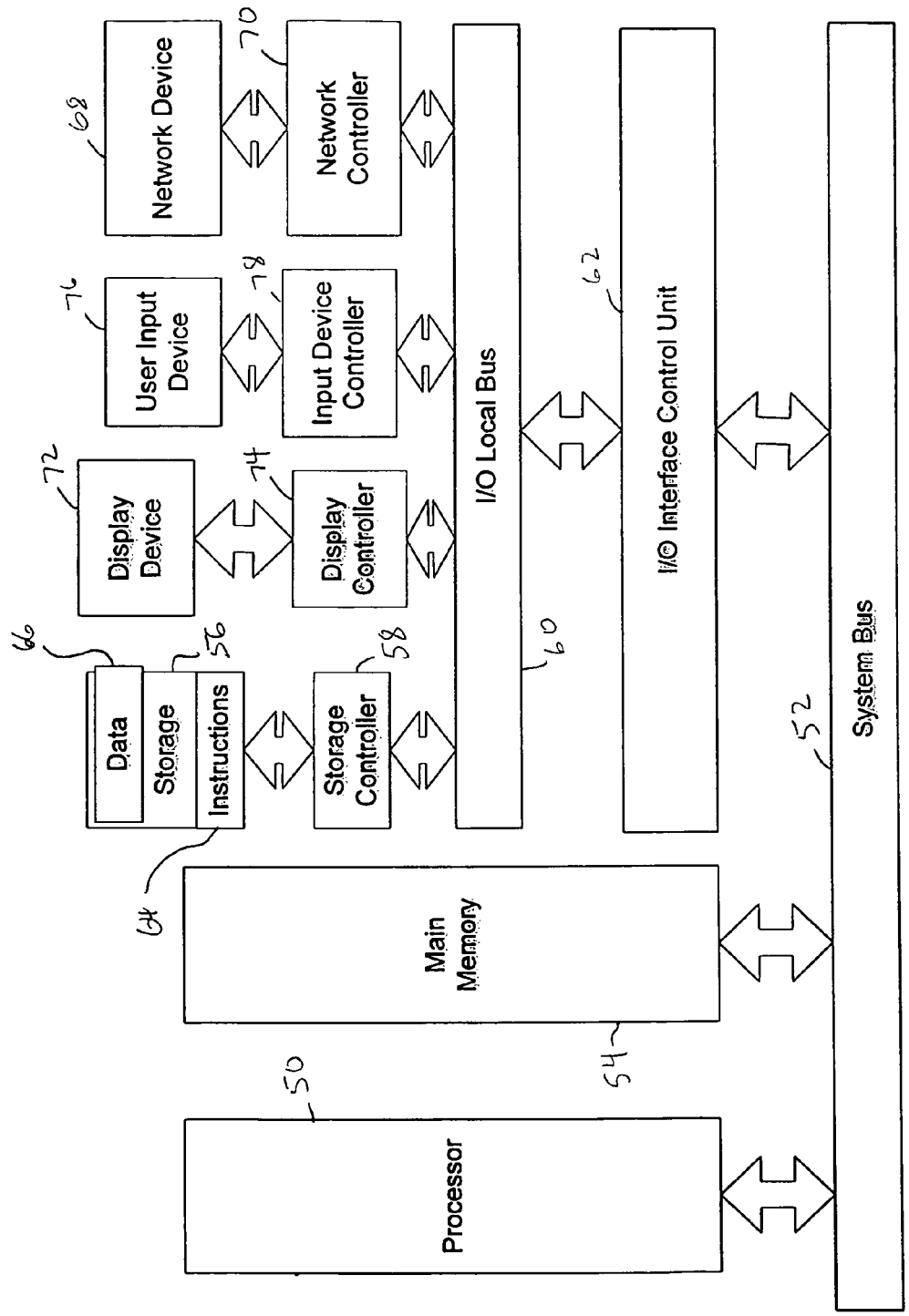
FIG. 15 is a block diagram of an architecture of a data processing system suitable for hosting a ratee or rater client in accordance with an embodiment of the present invention.

FIG. 15 is a block diagram of an architecture of a data processing system suitable for hosting a ratee or rater client in accordance with an embodiment of the present invention. A data processing system suitable for hosting a ratee or rater client includes a processor operatively coupled via a system bus to a main memory 54. The processor is also coupled to a storage device 56 via a storage controller 58 and an I/O local bus 60 through a I/O interface control unit 62. The storage device includes stored program instructions 64 and data 66 used to implement the operations of the previously described ratee and rater clients. In operation, the program instructions implementing a ratee or a rater client are stored on the storage device until the processor retrieves the program instructions and stores them in the main memory. The processor then executes the program instructions stored in the main memory and operates on the data stored in the storage device to implement the features of a ratee or a rater client as described above.

The processor 50 is further coupled to a network device 68 via a network device controller 70 and the I/O local bus 60. The processor uses the network device to communicate with other data processing systems, such as a distributional assessment system as previously described.

The processor is further coupled to a display device 72 via a display device controller 74 and the I/O local bus 60. The processor uses the display device to generate user interface displays for use by a ratee or rater as previously described.

The processor is further coupled to a user input device 76 via a user input device controller 78 and the I/O local bus 60. The processor uses the user input device to receive user inputs of a ratee or rater as previously described.

Figure 16:
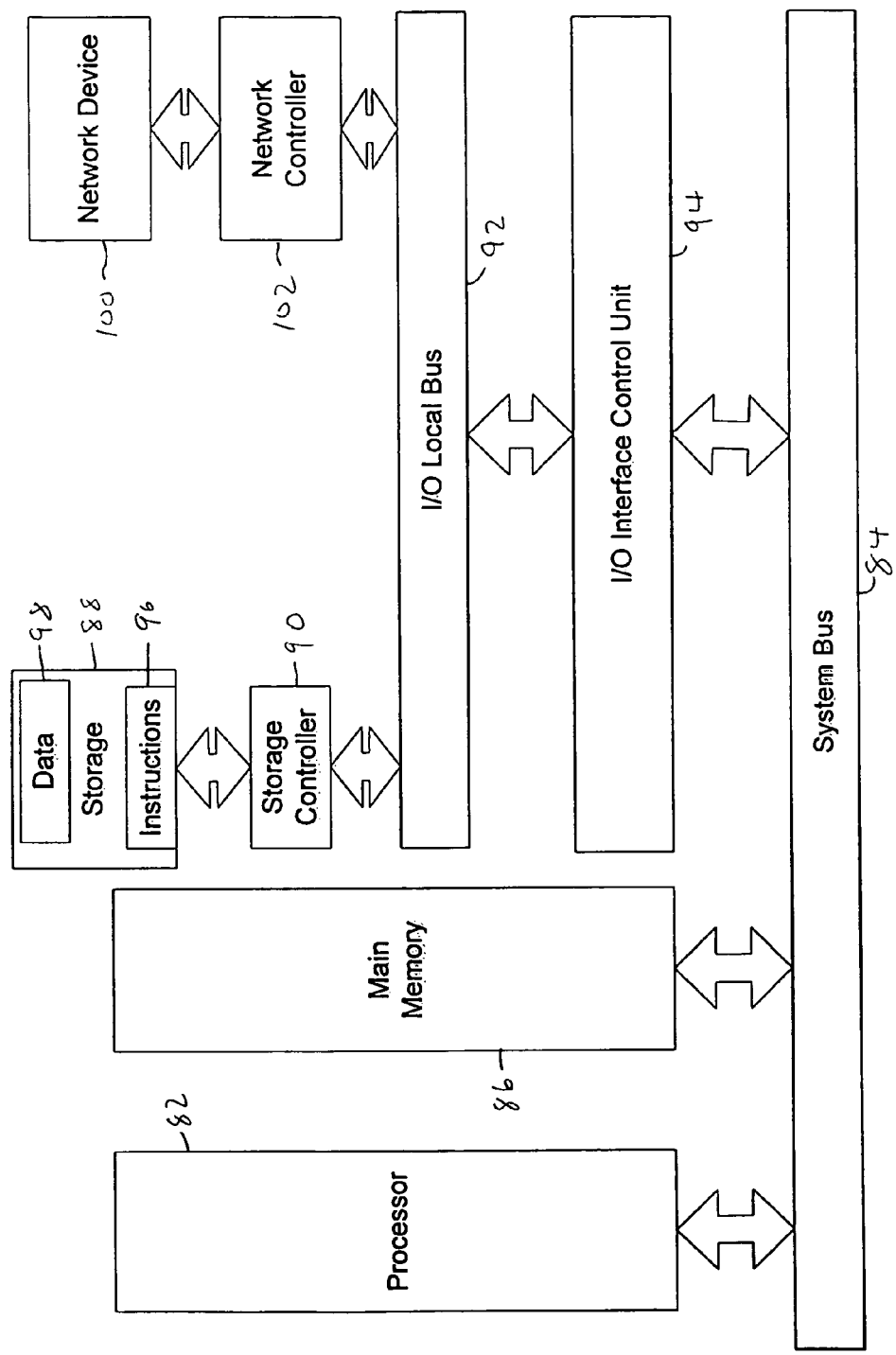
FIG. 16 is a block diagram of an architecture of a data processing system suitable for hosting a performance distribution assessor in accordance with an embodiment of the present invention.

FIG. 16 is a block diagram of an architecture of a data processing system suitable for hosting a performance distribution assessor in accordance with an exemplary embodiment of the present invention. A data processing system suitable for hosting a performance distribution assessor includes a processor 82 operatively coupled via a system bus 84 to a main memory 86. The processor is also coupled to a storage device 88 via a storage controller 90 and an I/O local bus 92 through a I/O interface control unit 94. The storage device includes stored program instructions 96 and data 98 used to implement the operations of the previously described performance distribution assessor. In operation, the program instructions implementing a performance distribution assessor are initially stored on the storage device until a web-based access procedure determines that it needs to be downloaded to an authorized user's computer. Once the program in the form of an Activex control has been situated on the user's computer, a successful login at the PDA website will cause the program to be activated. The processor within the user's computer then executes the program instructions stored in the main memory to implement the features of a performance distribution assessor as described above.

The processor is further coupled to a network device 100 via a network device controller 102 and the I/O local bus.

The processor uses the network device to communicate with other data processing systems, such as a data processing system hosting a ratee or rater client as previously described.

Description of Components of Performance Distribution Assessment

1. Procedure for Implementing Distributional Assessment:

The Performance Distribution Assessment system includes screens for the reporting of the best feasible and actual distributions associated with a ratee's performance on the aspects of value of each job function included in his/her appraisal. Since the direct reporting of the relative frequencies with which a ratee could have or did exhibit each of the five outcome levels defined for each aspect of value-job function combination is likely to prove excessively difficult for many raters, an easier approach to eliciting this information was devised. This approach consists of asking the following questions in reference to the 1 (low), 3, and 5 (high) outcome levels.

For reporting best feasible distributions:

Low: A question eliciting an estimate of the percentage of occasions when the job function was performed on which it was impossible to do any better than this low level on the aspect of value under consideration. Among the ways this could be asked are: On what percentage of these occasions was there no way to perform better than this? On what percentage of these occasions was it impossible to do better than this? On what percentage of these occasions was it impossible to do better than this? On what percentage of these occasions was this the best that anyone could have done?

Medium: A question eliciting an estimate of the percentage of occasions when the job function was performed on which it was possible to perform at this level but no better. Among the ways in which this could be asked are: On what percentage of these occasions was this the best that anyone could have performed? On what percentage of these occasions was it possible to perform as well as this but no better?

High: A question eliciting an estimate of the percentage of occasions when the job function was performed on which it was possible to perform at this level. Among the ways in which this could be asked are: On what percentage of these occasions was it possible to perform as well as this? On what percentage of these occasions was it possible to produce this outcome level?

For reporting actual distributions:

A question eliciting an estimate of the percentage of occasions when the ratee performed the job function on which he/she actually performed at each of the three (i.e., low, middle, and high) outcome levels. Among the ways in which this could be asked are: On what percentage of these occasions did the ratee perform at this level? On what percentage of these occasions did the ratee produce this outcome level? On what percentage of these occasions did the ratee perform like this?

Upon completion of the three questions referencing the best feasible or actual distribution, the two intermediate levels (2 and 4) are automatically entered into the portion of the display screen where the distributional information is summarized. In the case of best feasible distributions, this is done by dividing the difference between 100% and the sum of the three reported percentages among the two remaining outcome levels. This is done by allocating the proportion of the leftover percentage to the 2 and 4 levels according to the relative sizes of the percentages assigned to 1 and 5 levels.

In the case of the actual distributions, the allocation to the 2 and 4 levels uses the approach as described above for best feasible distributions, subject to the additional constraint that the percentages must conform to the limits imposed by the best feasible distribution. Such adjustments often will call for the initial percentage to be reduced for level 4 (next to highest) and increased for level 2. These initial percentages are shifted by the minimum amount necessary to bring the percentages into conformance with the best feasible distribution.

2. The Distribution Adjustment Tool:

Since the initial percentages estimated for levels 2 and of the best feasible and actual distributions are merely mathematical estimates, the rater may wish to alter the initially estimated distributions. However, since the percentages forming a distribution must add up to 100%, any increase in the percentage for one level must be accompanied by decreases in the percentages for one or more other levels that sum to the increased percentage. Similarly, any decrease in the percentage for one level must be accompanied by increases in the percentage for one or more other levels that sum to the decreased percentage. Since allowing raters to make such changes in an unrestricted manner would risk producing invalid distributions, a tool was devised to ensure that all changes conformed to the zero sum nature of the distributions. This tool, called the Distributional Adjustment Tool, consists of a row for each of the outcome levels and three columns: one for the outcome level's identifier; one consisting of five buttons, each labeled "−1", under the heading "Increase highlighted level by taking from . . . "; and one consisting of five buttons, each labeled "+1", under the heading "Decrease highlighted level by giving to . . . ". This tool appears whenever a level in the distribution summary is clicked (after all of its levels have been filled in). It displays with the corresponding row highlighted. The buttons for this row are inactivated because no row can be increased or decreased directly. In the case of best feasible distributions all buttons in the other rows are activated until the respective row's percentage reaches either zero percent (which inactivates its "−1" button) or 100% (which inactivates its "+1" button). These same characteristics apply to the application of the tool to actual distributions, with the additional constraint that buttons become inactivated when the limits of the best feasible distribution prevent any percentage from being further reduced (which inactivates its "−1" button) or from being further increased (which inactivates its "+1" button).

The focal or highlighted level in the Distributional Adjustment Tool may be changed either by clicking on a different row in the distributional summary on by clicking on different row in the Distributional Adjustment Tool itself.

3. Weighting of Job Functions:

The conventional practice of weighting involves asking respondents to assign relative weights to the items being weighted according to their relative "importance." The problem with this practice is that the meaning of importance is left to the subjective interpretation on the respondent. In addition, there is no control over whether the respondent is reporting the importance of each item in isolation, its incremental importance after all other items have been considered, or its importance before any other items are considered. To overcome this ambiguity in the subjective interpretation of importance, a method called swing weighting has been developed. This approach asks the respondent to report how much of a change in the overall value of the set of items would occur when a focal item dropped to zero value while all the other items remained at their maximum value. a novel simplified approach to swing weighting was devised for the Performance Distribution Assessment system. This approach consists of two parts. In part one, the respondent is asked first to designate the job function that could contribute the most value to the organization if it were performed perfectly. Then, the respondent is asked to assign a percentage to each of the other job functions that reflects the percentage of the most valuable function's contribution that it could contribute if it were performed perfectly. In part two, the respondent is asked first to designate the job function that could potentially cause the most harm to the organization if it were performed at the worst tolerable level. Then, the respondent is asked to assign a percentage to each of the other job functions that reflects the percentage of the most potentially harmful function's damage to the organization that it would cause if it were performed at the worst level tolerable. The weights are then computed as the difference between the "contribution" and "damage" percentages assigned to each job function. The resulting weights are normalized so that they sum to 1.0. These weights reflect the maximum difference that each function could make in the swing between its maximum and minimum performance. No assumptions are made about performance on any of the other functions when such a swing might occur, which is actually an advantage over conventional swing weighting. The latter's requirement that the respondent envision a situation in which all other items are at their maximum levels often represents a situation that is unimaginable to the respondent and casts doubt upon the applicability of his/her responses to more realistic concomitant levels on the other items. The same weighting process as described above is used in establishing the weights for the aspects of value within each job function during system setup.

4. Dynamic Weighting:

The weights of each job function, and of the aspects of value of value on which each job function is rated, are formulated under the assumption that the full range of performance on each aspect of value of each job function is possible. In actuality, situational factors restrict the range of feasible performance, as reflected in the best feasible performance distributions that are reported. It follows that the weights of a job function and of its aspects of value should be adjusted to reflect the amount of difference that was actually feasible to exhibit on these job components. The PDA scoring system does precisely this, reducing the weight of each aspect of value, and of the job function as a whole, by the degree to which performance on the respective component was restricted to less than perfection by situational factors beyond the performer's control. The resulting adjusted weights reflect the true relative influence that the job components were able to exert during the period of performance in question. This is a completely novel approach to weighting never before proposed or used.

Weights for the job functions are computed by first determining the weighted average constraint score (i.e., the percentage of perfect performance represented by the best feasible performance) for the aspects of value subsumed under each job function. The weights used here are the original raw normalized weights established for the aspects of value. The original weight that the rater assigned to the job function is then multiplied by the function's weighted average constraint score. This results in a job function weight that has been adjusted for the restriction in its impact caused by the degree of constraint under which its aspects of value were performed. The adjusted job function weights are normalized so that they sum to 1.0.

6. Multiple Rater Selection and Weighting

The PDA system uniquely offers the capability to separately assign people holding an organizational relationship with the ratee to participate in the assessment of the ratee's performance on EACH job function. This is in contrast to all other assessment systems that employ multiple raters which only allow raters to be included on an all-or-nothing basis: either a person is included as a rater and assesses the ratee on all the job functions designated for inclusion in the appraisal, or the person is not included in the appraisal at all. In the PDA system a person may be selected to participate in the rating of one or any subset of job functions. In addition, the PDA system allows for the differential weighting of the raters designated to participate in the rating of each job function. This is done by dividing 100% among the people designated to participate in the rating of each job function on the basis of the amount of influence that is considered to be appropriate to allocate to each rater in determining the overall score on the given job function.

The procedure for selecting the people to participate in the assessment of each job function consists of first clicking the name of the job function in the list of job functions designated for inclusion in the ratee's appraisal. Then, in the organization chart centered on the ratee in the upper right third of the screen, the position boxes of as many people as deemed necessary to properly assess the ratee's performance on the job function are double-clicked. As their position boxes are clicked, the names of the ratees selected to participate in the rating of the function are listed both in the weighting section at the lower left and in the tree list summary box at the lower right of the screen.

The weighting of the selected raters within each job function cannot be initiated until a button is pressed indicating that the selection of raters has been completed for all job functions. This then activates the weighting grid. When the name of a job function is clicked and highlighted in the list of job functions after the weighting grid has been activated, it brings up the list of raters assigned to rate that job function. The supervising rater is then able to divide 100% among the raters for the highlighted job function. At any time, the supervising rater may click on the position boxes of additional raters he/she may wish to add. If the weighting of the raters assigned to the function has already been completed, the addition (or deletion) of a rater will cause the weights for all of the remaining raters for that function to be returned to zero and the weighting of the new set of raters for the function will have to be redone.

Once the selection and weighting of raters for all functions has been completed, the supervising rater clicks on the "Multisource Specification Completed" button and the program takes the following steps:

(1) The job functions each participating rater has been assigned to rate are determined.

(2) An email is sent to each participating rater informing him/her of the name of the ratee for whom he/she has been designated as a participating rater, the job functions on which he/she will be assessing the ratee's performance, and the due date for his/her completed ratings.

(3) An entry for the rater is made in the Multisource Ratees table of the database that lists the rater's i.d., the ratee's i.d., the supervising rater's i.d., the due date of the appraisal, and the codes for each of the job functions the rater has been assigned to rate for the ratee.

(4) A tickler system is activated that sends email messages to remind the rater to do the assigned appraisal, if he/she hasn't already completed it, on a weekly basis until the 2-week mark, bi-weekly from the 2-week until the 1-week mark, and then daily from the 1-week mark on. After the due date, the reminders go daily to both the rater and to his/her supervisor.

7. The Gainplan Tool for Performance Management:

The GainPlan screen is accessed from the Appraisal Control Center screen by clicking on the button labeled "GainPlan." This causes a screen to display which reports the employee's overall performance level during the last recorded period of performance that was appraised. The user (i.e., the employee or his/her supervisor, possibly in collaboration) is then asked to enter the target level that he/she aspires to achieve in the forthcoming year. This information is transmitted to the PDA service provider's website where it is stored in a database table and a code is set alerting a scanning program that a GainPlan request has been submitted. The GainPlan scoring program then computes the easiest possible set of performance improvements necessary to achieve in order to reach the aspired performance target. The subset of performance dimensions selected, and the gain required on each, represent the easiest path to the targeted performance in the following sense. Each increment of gain is allocated on the basis of a joint consideration of the level at which performance dimensions were performed (it is easiest to produce a given increment of gain on the performance dimension that was performed lowest) and the situationally adjusted weights of the dimension in the last appraisal (a given increment of gain will contribute more to overall performance on higher weighted functions). The report of the results of the GainPlan analysis lists the performance dimensions (i.e., aspect of value-job function combinations) upon which attention should be focused in order to achieve the aspired-to gain in descending order of the amount of improvement that must be produced. In addition, the report conveys the precise record of outcomes that would need too be achieved on each performance dimension in order to raise overall performance to the aspired-to level. Notification of the availability of the GainPlan for viewing is transmitted by email to the rater and ratee immediately upon completion of the analysis. Reports are viewed by accessing a password protected website maintained for this purpose by the PDA service provider.

8. RaiseMax

This report is the direct analog of the GainPlan report, but focuses on finding the optimal path to raising the ceiling on a job's performance (i.e., feasibility) rather than on performance relative to the ceiling. The user (i.e., the employee or his/her supervisor, possibly in collaboration) enters the target level of feasibility sought for his/her position in the forthcoming year. This information is transmitted to the PDA service provider's website where it is stored in a database table, and a code is set alerting a scanning program that a RaiseMax request has been submitted. The RaisePlan scoring program then computes the easiest possible set of feasibility improvements necessary to achieve in order to reach the aspired-to feasibility target. The subset of performance dimensions selected, and the feasibility increase required on each, represent the easiest path to the targeted feasibility level in the following sense. Each increment of feasibility increase is allocated on the basis of a joint consideration of the level of feasibility characterizing the performance dimensions (it is easiest to produce a given increment of feasibility on the performance dimension that is most restricted) and the situationally adjusted weights of the dimensions in the last appraisal (a given increment of feasibility will contribute more to overall feasibility on higher weighted functions). The report of the results of the RaiseMax analysis lists the performance dimensions (i.e., aspect of value-job function combinations) upon which attention should be focused in order to achieve the aspired-to feasibility increase in descending order of the amount of increase that must be produced. In addition, the report conveys the precise record of outcomes that would need to be feasible on each performance dimension in order to raise overall feasibility to the aspired-to level. Notification of the availability of the RaiseMax for viewing is transmitted by email to the rater and ratee immediately upon completion of the analysis. Reports are viewed by accessing a password-protected website maintained for this purpose by the PDA service provider.

9. Performance Enhancement Planning (PEP):

PEP carries the logic of the GainPlan to the level of the entire organization and determines the optimal performance improvement contribution of every division, department, and work unit to the achievement of the organization's target level, pinpoints the amount of improvement needed from each individual within each level, and then develops a GainPlan for each targeted worker that will, collectively, raise the organization's overall performance to the target level. It employs the same optimizing principle as the GainPlan system, except in this case the units of analysis are positions rather than performance dimensions, and the weights are the pay rates of the positions.

10. Feasibility Enhancement Planning (FeasPlan):

FeasPlan carries the logic of the RaiseMax system to the level of the organization as a whole and determines the optimal contribution of every division, department, and work unit to the achievement of the organization's targeted level of feasibility, pinpoints the amount of feasibility increase needed from each individual position within each level, and then develops a RaiseMax report for each targeted position that will, collectively, raise the organization's overall feasibility to the target level. It employs the same optimizing principle as the RaiseMax system, except in this case, the units of analysis are positions rather than performance dimensions, and the weights are the pay rates of the positions.

11. MetaPlan

This is the ultimate tool for raising the absolute effectiveness of workforce performance. Absolute effectiveness refers to the comparison between the level of performance actually achieved and the maximum level capable of being achieved under ideal conditions. This measure of effectiveness is distinguished from relativistic effectiveness, which refers to the comparison between the level of performance actually achieved and the maximum level feasible to achieve in the presence of situational constraints. When both the aggregate relativistic effectiveness level and the aggregate feasibility level for an organization are below 85%, efforts to raise the absolute effectiveness of workforce performance should find an optimal balance between focusing on raising relativistic performance and raising feasibility levels. What is needed in these circumstances is a coordinated, optimally effort-efficient plan to pinpoint the exact amount of performance and feasibility gains needed from each organizational division, department, and lower subunit in order for the organization as a whole to raise its aggregate performance to a targeted absolute effectiveness level. Then, the amounts of performance and feasibility gains assigned to each organizational subunit must be optimally allocated among the employees in that subunit.

MetaPlan produces such a plan to raise absolute performance effectiveness for a whole organization by simultaneously optimizing the contributions of performance and feasibility gains. Once MetaPlan has identified the employees targeted to contribute performance and/or feasibility gains and the size of the gains needed from them, a GainPlan and/or a RaiseMax plan is developed for each targeted employee to specify the optimal strategy for achieving the assigned gain(s) in each individual case. The collective result of implementing this coordinated strategy will be an enhanced overall level of absolute effectiveness for the workforce as a whole.

12. Performance-Based Internal Selection System (PerBISS):

This is an additional service which will be offered either as a standalone software program or as a web-based service. It allows a client organization to identify the most qualified internal candidate for a position the organization is seeking to fill. This system is unique in that it capitalizes on the commensurability of scores in all jobs in which performance is assessed through the PDA system. It also capitalizes on the use of the two dimensional framework of aspects of value and job functions as the means of defining appraisal content in all implementations of PDA.

PerBISS works by first having the organization specify the weights of the 6 aspects of value in the job to be filled. These are determined on the basis of prior performance appraisals of incumbents of this target job, and reflect adjustments for the incidence of constraints. Then another weighting factor has to be computed to take account of the degree to which each candidate had the opportunity to exhibit performance on each of the aspects of value in his/her prior jobs that are the source of information on the candidate's prior performance. This Candidate Involvement Correction is computed for each aspect of value in the following manner:

A. For each of the performance dimensions in each of the candidate's prior jobs for which PDA data exist, compute the product of the normalized adjusted weights for each performance dimension and the normalized adjusted weight for the job function under which the performance dimension is subsumed.

B. Sum the products in A for each aspect of value.

C. Compute the mean weight of each aspect of value by dividing B by the number of performance dimensions that were summed. Call this result the AOVCandWt.

D. Repeat computations A-C for each aspect of value in the prior appraisals of incumbents of the job to be filled. Call this result the AOVTargetWt.

E. Divide the AOVCandWt by the AOVTargetWt for each aspect of value. The result is the Candidate Involvement Correction for the respective aspect of value.

The effect of the Candidate Involvement Correction is to lower or raise the influence of a candidate's past performance on an aspect of value of his/her predicted performance in the job to be filled according to whether its emphasis in prior jobs was lower or higher than its emphasis in the job to be filled.

Then the candidates' past performance scores on the aspects of value are used with the normalized adjusted aspect of value weights of the job to be filled and the Candidate Involvement Correction to produce a weighted mean performance score expressing each candidate's predicted overall performance in the job to be filled. The following chart illustrates these computations:

| Aspect of Value | Weight in Job to be Filled | | Candidate Involvement Correction | | Candidate Prior Performance | | Predicted aspect of value score |
|---|---|---|---|---|---|---|---|
| Quality | .30 | X | 1.40 | X | .84 | X | .3528 |
| Quantity | .09 | X | .75 | X | .92 | X | .0621 |
| Timeliness | .25 | X | .90 | X | .87 | X | .1958 |
| Cost Effectiveness | .18 | X | .80 | X | .76 | X | .1094 |
| Need for Supervision | .10 | X | 1.20 | X | .90 | X | .108 |
| Interpersonal Impact | .08 | X | 1.50 | X | .85 | X | .0714 |
| Sums of Products | | | 1.0605 | | | | .8995 |
| Weighted Average Performance | | | | | | | .8482 |

Predicted performance of this candidate=84.82.

This is the first system for utilizing past performance scores as a basis for internal selection.

Example Procedure for Implementing Performance Distribution Assessment in an Organization 1. Orientation Sessions:

Before beginning the implementation, employees should be invited to attend small-group (i.e., up to 25 people) orientation sessions. The purpose of these sessions will be to acquaint the employees with the purposes and practices of appraisal, to explain why it is an essential component of organizational governance, to give an overview of the new method to be implemented, to explain why it is believed the new method will be much more fair and effective than any method to which they have been subject in the past, and to allow them to ask questions about the new system. A major purpose of these sessions will be to alleviate the natural distrust of performance appraisal held by most workers. The message will be that we recognize the validity of their feelings of distrust and are seeking to address them through this new appraisal methodology.

2. Data Collection Focus Groups:

Implementation project staff members will conduct focus groups consisting of up to 5 to 7 people each for each job or job family. The groups should consist of people employed in the same job or job family. There should be at least two of these first round focus groups per job, one (or more) consisting of incumbents and the other consisting of the job's supervisors. Each group will be led through the process of producing a job map that describes the breakdown of the job into its successively narrower component functions. Once each group has produced its job map, it will select one or two representatives to participate in a "reconciliation" group with representatives of the other group for the job/job family. The purpose of this new group is to reconcile the differences between the job maps produced by the two (or more) original groups and to arrive at a single job map representing the consensus of the original groups.

After the reconciliation group has produced the consensus job map, the members will then reach a consensus on the highest (i.e., broadest) job functions in the job map that satisfy the criteria of measurability and observability. These are the functions that will be used in the appraisal.

Finally, the reconciliation group will reach a consensus regarding the minimum subset of the six aspects of value (viz., quality, quantity, timeliness, cost effectiveness, need for supervision, and interpersonal impact) necessary to account for at least 80% of the value to the organization of performing each of the selected job functions.

3. Database Construction:

Database entries will be made for all jobs, job functions, and employees in the organization. IDs, passwords, and job codes will be assigned. Much of this data will be imported directly from the organization's HR database. Specialized software will create most of the other needed entries.

4. Weighting Survey:

In order to properly differentiate the contributions of performance on the aspects of value determined to be relevant to the valuation of performance on each job function, it is necessary to weight them. These weights need to be applicable wherever the function is performed, so it is appropriate to base them on as wide a representation of points of view as possible. Thus, the weights for the aspects of value of each job function should be based on the survey responses of as many incumbents and supervisors as the organization is willing to allow to participate. Generally, incumbent and supervisor responses should be separately averaged and then an overall average computed on the basis of equal weighting of the two separate averages. This survey will be conducted via the Internet. Participants will receive an email containing a hyperlink that will lead them to a web page for doing all the weightings of the aspects of value of job functions present in their own jobs and in the jobs of their subordinates. A computer program will determine the appropriate job functions to include in each participant's weighting web page.

5. Survey Analysis:

The survey responses will be analyzed to compute the weights to be applied to the Aspects of Value for each job function. The resulting weights will then be added to the database. This process is all automated via specialized computer software.

6. IT Implementation:

This task consists of working with the organization's IT staff to ensure that the PDA ActiveX control has permission to pass through the organization's firewall, and that the necessary browser software (viz., Internet Explorer) is installed on all workstations where appraisals will be conducted. In addition, at this stage project staff will work with the client's IT personnel to develop the precise specifications for any inputs to the organization's ERM database from the PDA reporting processes, and the procedures for updating the client's human resource records in the PDA service provider's database.

7. Rater Training:

All raters must be trained in the procedures for conducting the assessments. Since PDA includes a multisource appraisal capability, all employees who will be potential raters should receive the rater training. The training will consist of an explanation of the idea of reporting a distribution rather than a summary judgment, which is one of the two central differentiating features of PDA. The other one is the necessity to exclude the effects of situational constraints on performance from the range of performance for which each employee is held accountable. Approximately 90 minutes will be spent explaining and illustrating these and other key concepts. After a break, participants will be walked through the appraisal process, one step at a time. They will then be given the opportunity to conduct one or two practice appraisals. These will be scored and guidance will be given as to the interpretation and use of the score reports. These sessions should occupy approximately 4 hours of time.

8. Ratee Training:

If any or all of the employees will be serving only as a ratee and will not be eligible to participate as a rater in multisource appraisals, then a reduced version of the training will be furnished to them. This will not include practice in doing ratings, but will include a role play in which they are introduced to the process of reaching a consensus on the best feasible performance distributions with their supervisors. They will also receive the same basic 90 minute presentation on the conceptual background of the system, and they will be shown how to interpret the appraisal and GainPlan reports. These sessions should require approximately 3 hours.

9. Dry Run Appraisals:

After the training of raters and ratees has been completed, and the system has been installed on the workstations of all potential raters, and all other IT components are ready to go, raters will be asked to conduct a set of appraisals on their ratees. Even though these appraisals will not "count" for administrative purposes, they will be viewed by ratees and can be expected to have an informational effect upon them which could lead to positive impacts on their subsequent performance. Depending on the span of control of the raters involved in the project, they should be given 1 to 2 weeks to complete their appraisals. The raw data will be submitted just as in the "live" usage of the system, and score reports will be furnished virtually instantaneously to the rater and (it is recommended) to the ratee. PSI staff and specially trained organization members will be on-call during this period to answer any questions that may arise from raters or ratees, and to work out any bugs that may arise in the system. Ratees should certainly see the results, preferably directly or else via their supervisors. After viewing their results, they should then be asked to enter a request for a GainPlan.

10. Evaluation:

Immediately following completion of the dry run appraisals, a survey will be sent by email to all participants. This survey will inquire in detail about their reactions to, and satisfaction with, both the assessment process itself and the reports of its results. It will also ask for any suggestions for ways to improve the ease of the process and the meaningfulness of the reports. In addition, separate focus groups of one-hour duration will be conducted with 5 to 7 representatives of the incumbents of a sample of jobs and of supervisor/management personnel who served as raters, to explore their reactions to the use of the system in more detail.

What is claimed is:

1. A computer-implemented method for assessing job performance of a ratee comprising an individual worker in an organization in which a person's job performance can be evaluated, the method comprising:

in a computer selecting a ratee whose performance is to be appraised, selecting a set of job functions on which the ratee's performance is to be appraised, inputting into a computer-implemented distributional assessment program information relating to the selected ratee, to each selected job function, and to each of a set of aspects of value associated with each job function, the distributional assessment program prompting a user, in a questionnaire-style format, to input data that assigns relative weights to the selected job functions reflecting the relative difference in value each job function can contribute to the organization between an occasion when the job function was performed at its worst effectiveness level and an occasion when the job function was performed at its most nearly perfect level, the distributional assessment program prompting a user, in a questionnaire-style format, to input numerical rating data related to one or more of the aspects of value corresponding to each of the selected job functions associated with the ratee, the program adapted to process the inputted rating data in relation to the inputted weight data to produce a job performance assessment of a ratee that numerically expresses the aggregate effectiveness of the performance distributions achieved on the aspects of value associated with the job functions on which the ratee's performance was appraised, in which the distributional assessment program prompts a user, in a questionnaire-style format, to input numbers expressing a percentage of the ratee's total number of opportunities to perform each of the selected job functions on which it was possible to, or the ratee actually did, achieve each of a set of outcome levels on each of the aspects of value associated with the respective job functions, the program adapted to process the input rating data in combination with the input and pre-established weight data to produce a job performance assessment of the ratee reflecting the proximity of the achieved distribution to a best feasible distribution on each aspect of value associated with each selected job function, on each job function as a whole (comprising the weighted average of scores on the job function's associated aspects of value), on each aspect of value as a whole (comprising the weighted average of scores on the respective aspect of value across all the selected job functions on which it occurs), and on the job as a whole (comprising the weighted average of scores across the job functions or across the aspects of value).

2. The method of claim 1 in which the distributional assessment program has a first mode that prompts a user, in a questionnaire-style format, to select the job functions to serve as the basis for a ratee's approval; a second mode that prompts a user, in a questionnaire-style format, to make inputs used to compute the relative weights of the selected job functions in determining the ratee's overall performance score; a third mode that prompts a user, in a questionnaire-style format, to make inputs used to represent the best feasible performance distribution for each aspect of value corresponding to each selected job function; and a fourth mode that prompts a user, in a questionnaire-style format, to make inputs used to represent the actual performance distribution of each aspect of value corresponding to each selected job function.

3. The method according to claim 1 in which the program is adapted to process inputs comprising the assigned relative weights and actual performance data relating to the selected job function and best feasible performance data relating to the same job functions to produce a numerical performance assessment output that represents the best course of action to be taken to improve the ratee's job performance.

4. The method of claim 1 in which the user accesses the program via the Internet.

5. The method of claim 1 in which the user accesses the actual performance and best feasible distribution data via the Internet.

6. The method of claim 1 in which the user inputs the weight data and the job performance rating data via the Internet to a server that communicates with the distributional assessment program.

7. The method of claim 1 in which the distributional assessment program prompts a user, in a questionnaire-style format, to provide data indicating occurrence rates of a lowest level outcome, a middle level outcome; and a highest level outcome for each of the aspects of value for each selected job function.

8. The process of claim 7 in which the distributional assessment program automatically assigns numerical scores to two intermediate levels of job performance between the highest and the middle levels and between the lowest and middle levels to produce a distribution of occurrence rates that sum to 100% over the five outcome levels associated with each job function.

9. The method of claim 7 in which the program includes a distributional assessment tool which allows the user to adjust a percentage score associated with one or more levels of the distribution for an aspect of value of a selected job function in a manner that automatically ensures that the sum of the percentages forming the distribution continue to sum to 100%.

10. A computer-implemented method for assessing job performance of a ratee comprising an individual worker in an organization in which a ratee's job performance can be evaluated, the method comprising:

in a computer selecting a ratee whose performance is to be appraised, selecting a set of job functions on which the ratee's performance is to be appraised, the distributional assessment program prompting a user to input a first set of rating data quantifying a percentage of opportunities to perform a job function on which it was feasible to perform at different benchmark levels for each of the selected job functions, said first set of rating data representing a best feasible performance distribution for each selected job function, the distributional assessment program prompting a user to input a second set of rating data quantifying a percentage of opportunities to perform a job function on which the ratee actually performed at the different benchmark levels for each of the selected job functions, the distributional assessment program prompting a user to input data that assigns relative weights to the selected job functions reflecting a relative difference in value each job function can cost or contribute to the organization between an occasion when the job function was performed at its lowest effectiveness level and an occasion when the job function was performed at its most nearly perfect level, the distributional assessment program adapted to process the first and second input rating data in relation to the inputted weighting data to produce a job performance assessment of the ratee that numerically expresses overall job performance, including performance across and within the job functions and the aspects of value on which the ratee's performance was appraised.

11. The method of claim 10 in which the distributional assessment program prompts a user to provide data indicating occurrence rates of the lowest level, the middle level, and the highest outcome level for each of the aspects of value for each selected job function.

12. The method of claim 11 in which the distributional assessment program automatically assigns numerical scores to two intermediate levels of job performance between the highest and the middle levels and between the lowest and a middle levels to produce a distribution of occurrence rates that sum to 100% over the outcome levels associated with each aspect of value for each selected job function.

13. The method of claim 11 in which the program includes a distributional assessment tool which allows the user to adjust a percentage score associated with one or more levels of the distribution for an aspect of value of a selected job function in a manner that automatically ensures that the sum of the percentages forming the distribution continue to sum to 100%.

14. The method of claim 10 in which the program is adapted to process the resulting job performance assessment to produce a performance improvement plan that represents the best course of action to be taken to improve the ratee's job performance.

15. The method of claim 14 in which the performance improvement plan prompts the user to input a target level to which it is desirable to raise the ratee's job performance, in which the program calculates an optimal set of performance improvements for raising the ratee's performance to the target levels, and in which the improvements are expressed both as percentages of gain on selected performance dimensions and as distributions of performance on the selected performance dimensions that would be closer to the best feasible distributions reported for at least one prior performance period.

16. The method of claim 10, including producing score reports comprising one or more of (a)-(e):
   (a) the overall performance score,
   (b) scores on each job function,
   (c) scores on each aspect of value on which a ratee's job functions can vary,
   (d) scores on each performance dimension (the combination of a job function and one of the aspects of value on which the job function can vary),
   (e) the best feasible and achieved distributions that were entered for job function or for each performance dimension.

17. The method of claim 10 in which the second set of rating data represents the actual observed performance distribution for each selected job function.

18. A computer-implemented method for assessing job performance of a ratee comprising an individual worker in an organization in which such a ratee's job performance can be evaluated, the method comprising:
   in a computer selecting a ratee whose performance is to be appraised,
   selecting a set of job functions on which the ratee's performance is to be appraised,
   a distributional assessment program prompting a user to input a first set of rating data quantifying the percentages of opportunities to perform a job function on which it was feasible to perform at different benchmark levels for each of the selected job functions, said first set of rating data representing a best feasible performance distribution for each selected job function,
   the distributional assessment program prompting a user to input a second set of rating data quantifying the percentages of opportunities to perform a job function on which the ratee actually performed at the different benchmark levels for each of the selected job functions,
   the distributional assessment program adapted to process the second set of rating data in relation to the best feasible performance distribution to produce a job performance assessment of the ratee that numerically expresses an aggregate performance distribution achieved for the selected job functions.

19. The method of claim 18 in which the distributional assessment program prompts a user to input data that assigns relative weights to the selected job functions reflecting the relative difference in value each job function can cost or contribute to the organization between an occasion when the job function was performed at its lowest effectiveness level and an occasion when the job function was performed at its most nearly perfect level,
   the distributional assessment program adapted to process the first and second input rating data in relation to the input weight data to produce a job performance assessment of the ratee that numerically expresses overall job performance with respect to the aspects of value associated with the job functions on which the ratee's performance was appraised.

20. The method of claim 18 in which the first set of rating data comprises estimates of the percentages of opportunities to perform the function on which it was impossible to exceed a lowest outcome effectiveness level, on which an intermediate outcome effectiveness level was the best that could be achieved, and on which it was possible to achieve a highest outcome effectiveness level; and in which the second set of rating data comprises the percentages of opportunities to perform the function on which the ratee actually achieved the lowest, intermediate and highest outcome effectiveness level for the selected job function.

\* \* \* \* \*